(12) United States Patent
Yang et al.

(10) Patent No.: US 8,046,564 B2
(45) Date of Patent: Oct. 25, 2011

(54) RECONFIGURABLE PAIRED PROCESSING ELEMENT ARRAY CONFIGURED WITH CONTEXT GENERATED EACH CYCLE BY FSM CONTROLLER FOR MULTI-CYCLE FLOATING POINT OPERATION

(75) Inventors: Hoon Mo Yang, Gyeonggi-do (KR); Man Hwee Jo, Seoul (KR); Il Hyun Park, Chungcheongbuk-do (KR); Ki Young Choi, Seoul (KR)

(73) Assignee: Core Logic, Inc., Seoul (KR)

( * ) Notice: Subject to any disclaimer, the term of this patent is extended or adjusted under 35 U.S.C. 154(b) by 416 days.

(21) Appl. No.: 12/234,507

(22) Filed: Sep. 19, 2008

(65) Prior Publication Data
US 2009/0083519 A1    Mar. 26, 2009

(30) Foreign Application Priority Data
Sep. 20, 2007  (KR) .................. 10-2007-0095852

(51) Int. Cl.
*G06F 9/302*  (2006.01)

(52) U.S. Cl. .......................................... 712/15; 712/222
(58) Field of Classification Search .................. None
See application file for complete search history.

(56) References Cited

U.S. PATENT DOCUMENTS

| 4,901,267 A | * | 2/1990 | Birman et al. ............... 708/513 |
| 2010/0174891 A1 | * | 7/2010 | Nomoto ....................... 712/222 |

* cited by examiner

*Primary Examiner* — Kenneth Kim
(74) *Attorney, Agent, or Firm* — Edwards Angell Palmer & Dodge LLP; Kongsik Kim

(57) ABSTRACT

Techniques, systems and apparatus are described for providing a processing element (PE) structure forming a floating point unit (FPU)-processing element. Each processing element includes each of two multiplexers (MUXes) to receive data from one or more sources including another PE, and select one value from the received data. The processing element includes an arithmetic logic unit (ALU) in communication with the two multiplexers to receive the selected value from each multiplexer as two input values, and process the received two input values to generate results of the ALU.

13 Claims, 8 Drawing Sheets

RECONFIGURABLE PAIRED PROCESSING ELEMENT ARRAY CONFIGURED WITH CONTEXT GENERATED EACH CYCLE BY FSM CONTROLLER FOR MULTI-CYCLE FLOATING POINT OPERATION

CLAIM OF PRIORITY

This application claims priority under 35 U.S.C. §119(a) to Korean Patent Application No. 10-2007-0095852, filed on Sep. 20, 2007, in the Korean Intellectual Property Office, the contents of which is incorporated herein in its entirety by reference.

BACKGROUND OF THE DISCLOSURE

The present disclosure relates to a multimedia device.

Digital information processing and apparatus for performing complex processing can be implemented for various application including multimedia platforms. For example, different application programs can be implemented for processing audio data and/or video data in mobile systems, such as cellular telephones, smart phones, personal digital assistances (PDAs), etc. These application programs generally perform data intensive computations and can be implemented using a software implementation (SI) operated on a target processor and/or using an application specific integrated circuit (ASIC) type hardware implementation (HI).

SUMMARY OF THE DISCLOSURE

Among other things, techniques, systems and apparatus are described for providing a processing element (PE) structure forming a floating point-reconfigurable array (FP-RA) for FP arithmetic, and an FP-RA control circuit for controlling the same FP-RA, in an FP-RA structure that can support FP arithmetic.

In one aspect, a processing element (PE) structure is provided to include at least two processing elements in communication with each other to form a floating point unit (FPU)-processing element. Each processing element includes two multiplexers. Each of the two multiplexers (MUXes) receives data from one or more sources including another PE, and selects one value from the received data. Each processing element includes an arithmetic logic unit (ALU) in communication with the two multiplexers to receive the selected value from each multiplexer as two input values, and process the received two input values to generate results of the ALU.

Implementations can optionally include one or more of the following features. One of the at least two PEs forming the FPU-PE can include a mantissa PE, and the other PE can include an exponent PE. For the mantissa PE, the output register can include a sign register that stores a sign value. Each PE can include a shifter to perform a shift operation on the results of the ALU to generate results of the shifter. Each PE can include a temporary register in communication with the ALU and the shifter to store the results of the ALU and the shifter as interim results of the ALU and the shifter. Each PE can include an output register in communication with the ALU and the shifter to store the results of the ALU and the shifter as final results of the ALU and the shifter. Further, Each PE can include data paths formed between the ALU, the MUXes, the shifter, and the temporary register to support FP arithmetic. The multiplexers can be designed to receive the data that includes the interim results stored in the temporary register.

Implementations can optionally include one or more of the following features. The data paths can include a sign processing path to process an FP sign between the ALU and the output register; an un-shift operating path to transfer the results of the ALU from the ALU directly to the output register without performing a shift operation on the results; and a round operating path to support rounding operation between the shifter and the output register, and between the ALU and the output register. The un-shift operating path can transfer each output value of swap commands for swapping the two input values of the ALU, and while performing an n-bit shift operation, transfer a value of n to the exponent PE. The shifter can further include lower 2 bits for the rounding operation.

Implementations can optionally include one or more of the following features. The ALU can include an operand selector to selectively output two operands used on FP arithmetic. The ALU can include an operand operator performing an operand operation based on the selectively outputted operands received from the operand selector. The ALU can include a shift calculation selector selectively outputting result values from the operand operator to the shifter. The operand selector can include two operand MUXes to receive the input values through the two MUXes, a value through a feedback path, or an immediate value stored in a context layer of a configuration cache and selectively output one value each as the two operands. The operand operator can include an addition or subtraction circuit, an absolute value calculator circuit, a logical circuit, a swap circuit, a bus switch circuit, a flag generator circuit, a leading-one-detector (LOD) circuit, and a comparator circuit. The shift calculation selector can include a MUX shift circuit to selectively output result values requiring a shift operation from among result values of each element of the operand operator, and a MUX un-shift circuit to selectively output result values not requiring the shift operation.

Implementations can optionally include one or more of the following features. The PE structure can include a shift control circuit to control the swap circuit, the absolute value calculation circuit, the flag generator circuit, the LOD circuit, the MUX un-shift circuit, and the shifter so as to support the FP arithmetic. The swap circuit swaps two operands, the absolute value calculator circuit obtains an absolute value of a difference between values of the two operands, the flag generator circuit generates a flag to be transmitted to another PE structure, the LOD circuit obtains a location of the most significant bit having the value of 1 so as to normalize an exponent, the MUX un-shift circuit selectively outputs a value of the swapped operand or a value of the flag, and the shift control circuit receives a shift value generated by the LOD circuit and a context word, and controls the shift operation in the shifter. The two operand MUXes can provide the two operands as inputs to the addition or subtraction circuit, the logical circuit, the swap circuit, the bus switch circuit, the flag generator circuit, the LOD circuit, and the comparator circuit. The operand operator can provide output values of the addition or subtraction circuit, the logical circuit, and the swap circuit as inputs to the MUX shift circuit; output values of the swap circuit, the bus switch circuit, the flag generator circuit, LOD circuit, and the comparator circuit as inputs to the MUX un-shift circuit; and an output value of the MUX shift circuit as input to the shifter. The operand operator can provide the output value of the addition or subtraction circuit as an input to the absolute value calculator circuit; and the output value of the absolute value calculator circuit as input to the MUX shift circuit. The shifter can perform the shift operation by being controlled by the shifter control circuit connected to the bus switch circuit, the LOD circuit, and the configuration cache. The addition or subtraction circuit, the logical circuit, the swap circuit, the bus switch circuit, the flag generator circuit, the LOD circuit, the comparator circuit, the MUX shift circuit, and the MUX un-shift circuit are controlled via ALU control signals.

In another aspect, a system is provided for controlling a processor element (PE) structure. The system includes a PE structure that includes two or more PEs in communication with each other to form a floating point unit (FPU)-processing element. The system includes a floating point-reconfigurable array (FP-RA) control circuit in communication with the PE structure to control the PE structure to perform FP arithmetic. Also, the system includes a configuration cache in communication with the FP-RA control circuit to store a context word used by the PE structure to perform the FP arithmetic operations.

Implementations can optionally include one or more of the following features. The FP-RA control circuit can include a finite state machine (FSM) based control circuit. The configuration cache can include a register. Also, the FSM based control circuit can be connected to the register of the configuration cache to generate and transmit a context word for a multi-cycle operation of the PE structure to the register of the configuration cache. An operation command of the FP arithmetic can be mapped and decoded in the configuration cache, and the FSM based control circuit can operate when the operation command is a command for a multi-cycle operation. The configuration cache can determine whether the operation command is the command for the multi-cycle operation. If the operation command is the command for the multi-cycle operation, the configuration cache can operate the FSM based control circuit so as to generate a context word for a multi-cycle and controls the PE structure to perform the multi-cycle operation. If the operation command is not the command for the multi-cycle operation, the configuration cache can control the PE structure to perform an arithmetic operation without operating the FSM based control circuit.

Implementation can optionally include one or more of the following features. The PE structure can use the FSM based control circuit to perform FP arithmetic on four arithmetic operations and a transcendental function. One of the two PEs forming the FPU-PE can include a mantissa PE that receives signs and mantissas of the two operands. The other PE can include an exponent PE that receives exponents of the two operands. The PE structure can perform the FP arithmetic for addition or subtraction, and the addition or subtraction is performed using the multi-cycle operation that includes 6 cycles. The PE structure can perform the FP arithmetic for the addition operation that includes comparing values of two operands received by the PE structure based on exponents and mantissas of the received operands in a first cycle; arranging bits of one of the exponents having a smaller value of the two by shifting the bits by a difference between the mantissas in a second cycle; obtaining a difference between the exponents and performing a 1-bit alignment on the difference between the exponents considering an overflow in a third cycle; normalizing a result of the third cycle so that the most significant bit is 1 in a fourth cycle; updating a radix point in the exponent PE and performing a rounding operation in the mantissa PE in a fifth cycle; and performing an exception check in a sixth cycle.

Implementation can optionally include one or more of the following features. The PE structure can transmit the radix point changed by the normalization to the exponent PE in the fourth cycle and update the radix point in the exponent PE by using the received radix point in the fifth cycle. The PE structure can perform the subtraction in a same manner as the addition after changing a sign of a number that is subtracted. The PE structure can perform the FP arithmetic for multiplication or division, wherein the multiplication is performed through a multi-cycle operation of a total of 4 cycles, and the division is performed through a multi-cycle operation of a total of 6 cycles. The PE structure performs the multiplication or division based on an exponent and a mantissa, wherein the exponent is processed by addition or subtraction, the mantissa is processed by multiplication or division, and the mantissa PE that calculates the mantissa from among the FPU-PE is connected to a multiplier or a divider. The PE structure performs the multiplication by performing the addition or subtraction in the exponent and the multiplication in the mantissa in a first cycle; performing a 1-bit alignment according to the result of the multiplication in the multiplier in a second cycle; performing a rounding operation on the mantissa, applying the result of the 1-bit alignment of the mantissa performed in the second cycle in the exponent; and if the value of exponent exceeds a certain range, transmitting a signal that is to be applied to the mantissa in a third cycle; and performing an exception check in the mantissa in a fourth cycle.

BRIEF DESCRIPTION OF THE DRAWINGS

Like reference numerals represent like features in the above figures.

DETAILED DESCRIPTION OF THE DISCLOSURE

Techniques, systems and apparatus are described for providing a processing element (PE) structure that forms a floating point-reconfigurable array (FP-RA) supporting FP arithmetic operation. In addition, an FP-RA control circuit is described for controlling the FP-RA.

Data intensive computations can be implemented using an SI operated on a target processor and/or using an ASIC type HI. The SI is flexible enough to sufficiently support various application programs. However, the SI cannot cope with the complexity of application programs. For example, the SI requires a high-rate clock signal because the software sequentially performs operations even though the SI can implement a rapid and flexible CODEC using a digital signal processor (DSP) dedicated core.

In contrast to SI, the HI is limited to specific application programs even though the HI can be optimized in terms of power consumption and operation execution efficiency. Moreover, an ASIC IP implemented using a conventional hard-wired circuit can guarantee processing at a high speed. However, this ASIC IP has a large chip size and high power consumption due to very low hardware reusability and a long development time because the circuit must be re-designed whenever a new function is added to the ASIC IP. Furthermore, the aforementioned problems can become serious because current chip manufacturing techniques integrate a variety of complicated functions into a single chip owing to the development of system on chip (SoC) and the influence of digital convergence.

A reconfigurable array (RA) processor can perform a single instruction stream multiple data stream (SIMD) operation while maintaining high hardware reusability. Thus, the RA processor can achieve high operating performance even though the RA includes hardware smaller than a hard-wired logic and a clock signal having a rate lower than a clock signal used for software. Because these characteristics of RA can reduce chip cost and power consumption, the RA processor is suitable for a mobile multimedia platform with limited hardware resources.

The RA processor is divided into a fine-grained RA (FGRA) processor and a coarse-grained RA (CGRA) processor. The FGRA has a processing element (PE) in the form of a truth table logic circuit performing Boolean operations and can perform bitwise operations. The CGRA has a PE in the form of an arithmetic and logic unit (ALU) and performs word-wise arithmetic/logic operations.

Although the FGRA has the more flexible structure because of the ability to perform an arbitrary operation, the FGRA has complicated control and data paths. Thus, the FGRA can be used for a circuit that does not require a high operating speed or for a circuit in which function inspection is important rather than the operating speed. The CGRA is sufficiently flexible at an algorithm level but not at a resistor transistor logic (RTL) level although the CGRA is less flexible than the FGRA. Furthermore, the CGRA can be easily arranged in parallel and thus CGRA is suitable for multimedia platforms. That is, the CGRA can achieve a higher performance than that of the SI and has a wider flexibility than that of the HI.

The CGRA includes programmable PEs. The CGRA programs or reconfigures the PEs according to a context word that designates connectivity and operations of the PEs so as to execute various functions by changing the contents of the context layer without adding new hardware to the CGRA. Typical CGRAs include Architecture for Dynamically Reconfigurable Embedded System (ADRES), an extreme processing platform (PACT-XPP) and etc. A conventional RA supports only integer arithmetic operations and thus the application range of such RA is limited to audio/video CODECs.

Multimedia application fields such as 3D graphics/2D vector graphics/GPS and the like are not suitable for being processed with a conventional integer-based CGRA because these multimedia application fields are based on floating point (FP) vector operations. To support graphics, a PE can be designed based on FP arithmetic. However, this design excessively increases the hardware size of the PE. Also, because CODEC is implemented only with integer arithmetic operations, the use of blocks related to floating points in hardware constituting a PE does not result in very inefficient hardware usage.

Figure 1:
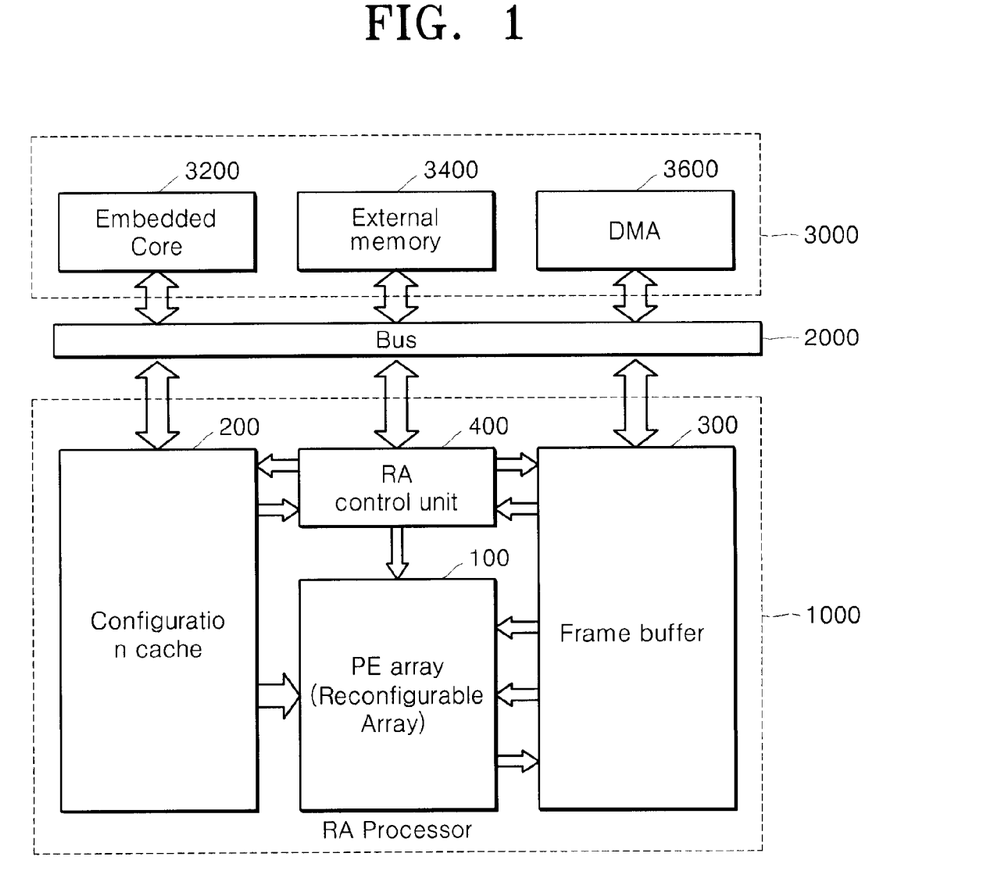
FIG. 1 is a block diagram illustrating a multimedia platform including a reconfigurable array processor supporting floating point (FP) arithmetic.

FIG. 1 is a block diagram illustrating a multimedia platform including a reconfigurable array processor supporting floating point (FP) arithmetic according to an embodiment of the present disclosure.

Referring to FIG. 1, the multimedia platform includes a reconfigurable array processor 1000, a system bus 2000 and a control and memory unit 3000. The reconfigurable array processor 1000 can perform FP arithmetic. The system bus 2000 is connected to each element of the reconfigurable array processor 1000. The control and memory unit 3000 controls the reconfigurable array processor 1000, by being connected to each element of the reconfigurable array processor 1000 through the system bus 2000, and stores data.

The reconfigurable array processor 1000 includes a processing element (PE) array or a reconfigurable array 100, a configuration cache 200, a frame buffer 300, and a reconfigurable array (RA) control unit 400.

The PE array 100 is a rectangular array of PEs, with each PE including an arithmetic logic unit (ALU). The PE array 100 performs a pipelined single instruction stream multiple data stream (SIMD) operation according to columns and/or rows. The PE array 100 is designed to support FP arithmetic. The PE array 100 is described further with reference to FIG. 2 below.

The configurable cache 200 stores context word that programs data operation and data transfer in the PE array 100. Here, the context word denotes a command or a program that instructs a connection relation between PEs inside the PE array 100, operations of each PE, and data transfer for an operation. The context word is stored in a context layer (not shown) of the configuration cache 200.

The frame buffer 300 is a type of a cache memory that temporarily stores interim data of an operation performed by the PE array 100.

The RA control unit 400 controls each element of the reconfigurable array processor 1000. For example, the RA control unit 400 controls input/output of context word of the configuration cache 200, input/output of data of the frame buffer 300, or transfer of data to the PE array 100.

The reconfigurable array processor 1000 can perform various operations by amending the context word without changing the hardware. Also, because the reconfigurable array processor 1000 performs operations in parallel through an array having a pipelined SIMD structure, the reconfigurable array processor 1000 can perform operations faster than a general processor that sequentially performs operations. Accordingly, the reconfigurable array processor 1000 according to the present disclosure can provide reusability of software and high performance of hardware.

Each element of the reconfigurable array processor 1000 is connected to each element of the control and memory 3000 through the system bus 2000. As such, the multimedia platform of the present disclosure has a system on chip (SoC) structure where all elements of the whole system are connected through the one system bus 2000.

The control and memory unit 3000 includes an embedded core 3200 for processing and controlling data, an external memory 3400 for storing data, and a direct memory access (DMA) controller 3600 for transferring data. The embedded core 3200 may be a reduced instruction set computer (RISC) processor or a processor in which characteristics of the RISC processor and a complex instruction set computer (CISC) processor are combined.

The multimedia platform according to the present disclosure may perform FP arithmetic by using a PE array structure for integer arithmetic, i.e. a conventional coarse-grained RA (CGRA) structure. Accordingly, the size of the hardware is maintained similar to the size of conventional hardware, and an efficient processor can be realized. Also, because the multimedia platform has an SoC structure, i.e. a structure where each element of the reconfigurable array processor 1000 is connected to each element of the control and memory 3000 through the system bus 2000, the multimedia platform can be effectively used in a mobile multimedia device that requires low power consumption and high performance.

The reconfigurable array processor 1000 that can perform FP arithmetic can be described with respect to a floating point unit (FPU)-PE structure that can support a floating point as PEs form a pair.

Figure 2:
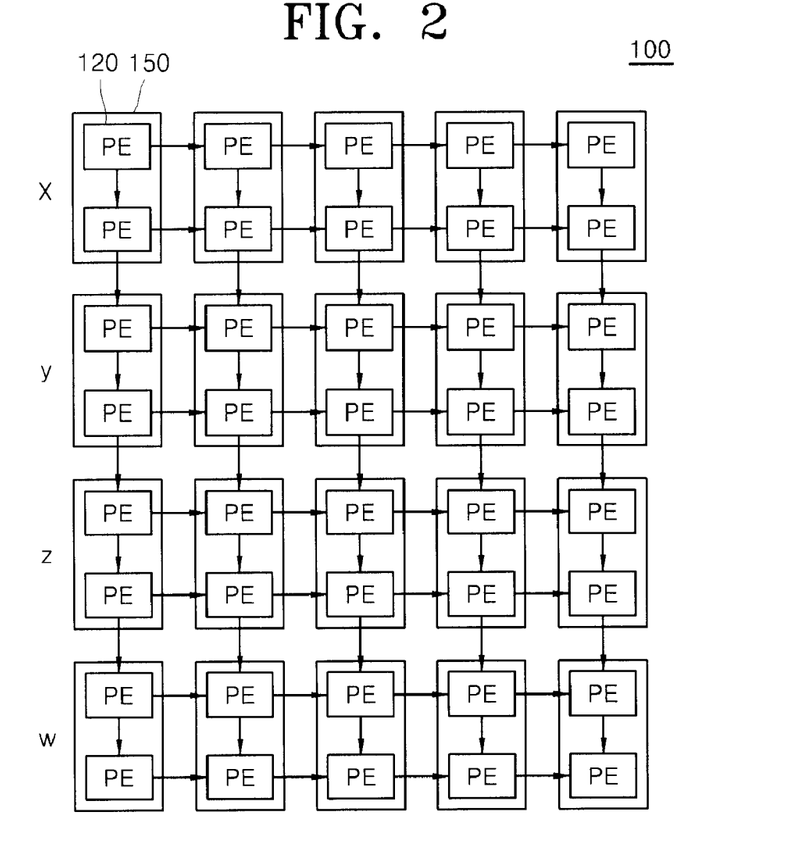
FIG. 2 is a block diagram illustrating a processing element (PE) array, where a floating point unit (FPU)-PE structure is formed as PEs in the PE array to form a pair for FP arithmetic.

FIG. 2 is a block diagram illustrating the PE array 100 of FIG. 1, where an FPU-PE structure 150 is formed by pairing up the PEs in the PE array 100 to form one or more PE pairs that support FP arithmetic. The PE array 100 has an array structure where multiple programmable PEs 120 form rows and columns. As described above, the multiple PEs 120 can be arranged to form multiple FPU-PE structures 150. Such a PE array 100 may be connected to a multiplier and a divider through a system bus in order to perform multiplication and division operations. For example, for integer arithmetic, each PE 120 performs multiplication and division operations, and thus all PEs 120 can be connected to the multiplier or the divider. However, for FP arithmetic, some PEs 120 perform multiplication and division operations while other PEs do not. Thus, only those PEs 120 that perform multiplication and division operations may be connected to the multiplier and the divider and those other PEs may not be connected to the multiplier and the divider.

Each PE 120 may include a 16-bit adder that receives and processes two operands so as to perform 16-bit integer arithmetic. During the integer arithmetic, the context layer of the configuration cache 200 of FIG. 1 stores a command for the integer arithmetic. The operations and data flow of the PE 120 are controlled according to the context word for such integer arithmetic.

In the PE array 100, the PEs 120 may be connected to each other in a mesh structure for data exchange, and the connection of the PEs 120 or data exchange between the PEs 120 is performed according to the context word in the configuration cache 200. In other words, each PE 120 forms a pipeline by being set up in a row or column unit based on the context word received from the configuration cache 200, and transmits the processing result of a setup pipeline operation to a direction indicated by the context word.

The PEs 120 in the PE array 100 have an 8×5 array structure, and the PE array 100 forms an FPU-PE structure 150 as two PEs 120 form a pair for the FP arithmetic. The FPU-PE structure 150 is formed as the two PEs 120 combine within a row or a column, and such a combination relation is formed according to a context word. In order to form the FPU-PE structure 150, a simple hardware operation should be performed on the PEs 120, i.e. a physical connection relationship between each PE 120 should be formed. Also during the FP arithmetic, the FPU-PE structure 150 may require a simple software control structure for the FP arithmetic.

The PE array 100 having the 8×5 array structure forms the FPU-PE structure 150, and the structure of the PE array 100 can be converted to a 4×5 array structure for the FP arithmetic. The 4×5 array structure can support a 4×1 vector operation that is very useful in 3D graphics. In FIG. 2, the reference letters X, Y, Z, and W denote each component of a 4×1 vector. The method of forming the FPU-PE structure 150 in the PE array 100 is not limited to the one shown in FIG. 2, and may vary. For example, a FPU-PE structure 150 may be formed by combining at least three PEs 120 together, so as to support more complicated FP arithmetic, such as a transcendental function and a square root.

The FPU-PE structure 150 performs arithmetic operations through temporal mapping, and cannot receive the next context word until the final value is obtained. Thus, the FPU-PE structure 150 performs FP arithmetic using a multi-cycle operation. Through such multi-cycle operation, the FPU-PE structure 150 receives a context word for a next operation after the final value is obtained in the FPU-PE structure 150. An example of the multi-cycle operation is described further with reference to FIG. 6 below.

Figure 3:
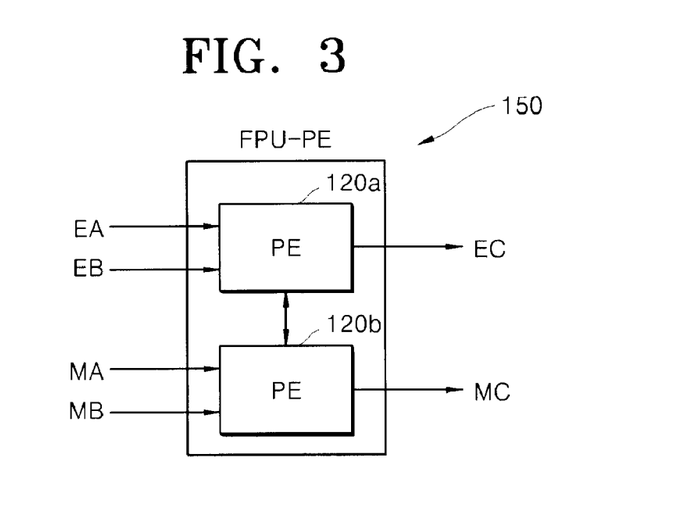
FIG. 3 is a block diagram illustrating an operand input structure for FP arithmetic in the FPU-PE structure illustrated in FIG. 2.

FIG. 3 is a block diagram illustrating an operand input structure for performing FP arithmetic in the FPU-PE structure 150 illustrated in FIG. 2. The PEs 120 that form the FPU-PE structure 150 represent the PEs for performing 16-bit integer arithmetic. Thus, the PEs 120 of the FPU-PE structure 150 receives two operands and outputs one output value, similar to a conventional PE that performs integer arithmetic.

An example format for performing FP arithmetic includes a mantissa and an exponent. Accordingly, each FPU-PE structure 150 for the FP arithmetic includes two PEs 120 that form a pair. One of the pair of PEs is a mantissa PE 120a that receives the mantissas and signs of the two operands as inputs. The other PE is an exponent PE 120b that receives the exponents of the two operands as inputs.

In FIG. 3, the two operands are represented by reference identifier A and B respectively. Thus, the reference identifier EA represents a sign and mantissa of the operand A, and the reference identifier EB represents a sign and mantissa of the operand B. Also, the reference identifier MA represents an exponent of the operand A, and the reference identifier MB represents an exponent of the operand B. The reference identifiers EC and MC represent the calculation results of the two PEs respectively. In particular, the reference identifier EC represents a sign and mantissa of the result value and the reference identifier MC represents an exponent of the result value.

The mantissa PE 120a and the exponent PE 120b use an operation circuit for an FP process, such as rounding and normalization. Also, the mantissa PE 120a and the exponent PE 120b use a data path for transferring data between the mantissa PE 120a and the exponent PE 120b. Such additional hardware can be easily added to a conventional PE array at low cost.

The FPU-PE structure 150 can perform various operations, such as an FP based transcendental function operation, a logic operation, and four arithmetic operations. However, to perform complicated FP arithmetic, such as a transcendental function, the FPU-PE structure 150 may be formed by combining together at least three PEs.

For an FP based PE, the total number of operations that can be simultaneously performed in the FP based PE is the same for the FP arithmetic and the integer arithmetic. However, when the FPU-PE structure 150 performs the integer arithmetic, the FPU-PE structure 150 is divided into two integral PEs, and thus the number of integer arithmetic operations that can be simultaneously performed is doubled compared to a conventional FP based PE. Accordingly, the FPU-PE structure 150 provides for an efficient use of the hardware.

When the FPU-PE structure 150 performs multiplication or division operations, the exponent PE 120b that received two exponents calculates a result through addition or subtraction, and the mantissa PE 120a that received the two signs and two mantissas calculates a result through multiplication or division. Thus, the mantissa PE 120a that calculates a mantissa is connected to a multiplier and a divider. The exponent PE 120b and the mantissa PE 120a are connected to each other so as to exchange a carry that is generated.

After the above calculations are performed, each result value, i.e. EC and MC, are provided as input values to a next FPU-PE structure 150 to perform a next calculation process. If the result values EC and MC are determined to be the final values, these result values are stored in the frame buffer 300 of FIG. 1.

Figure 4:
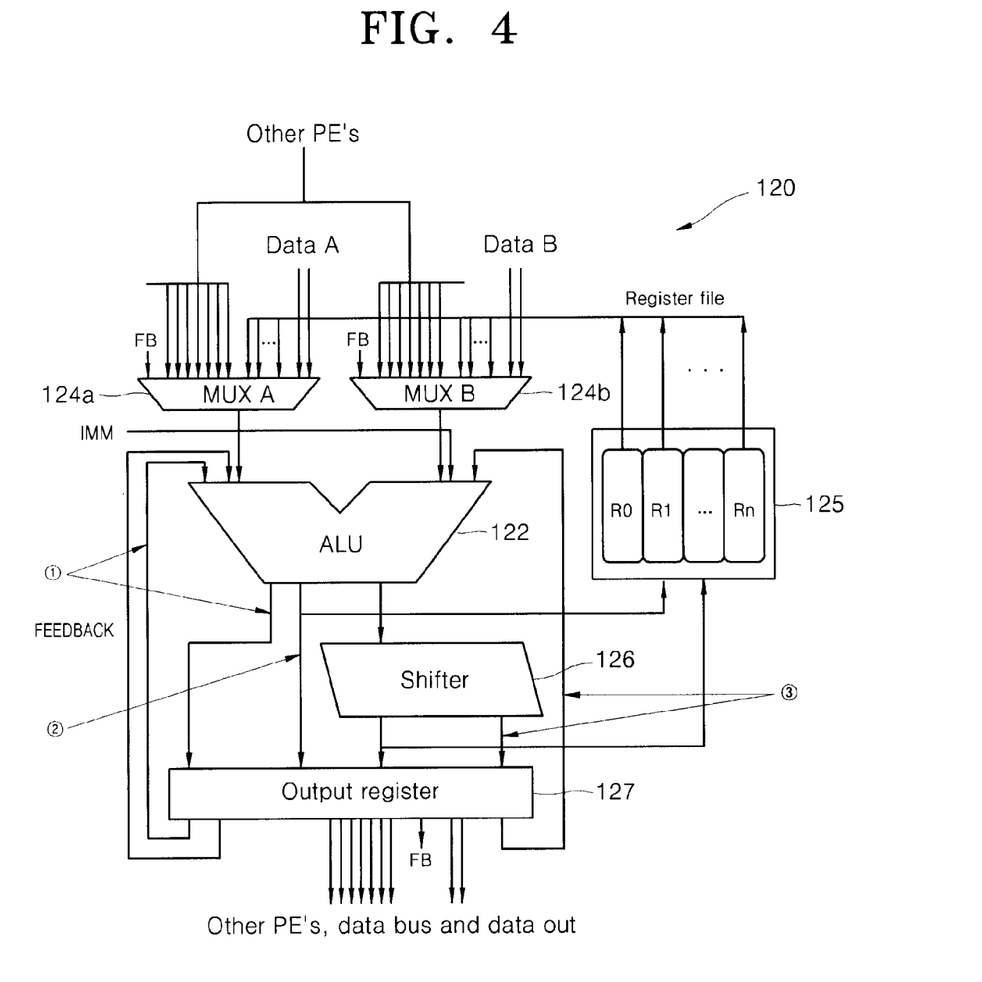
FIG. 4 is a block diagram illustrating a PE structure of FIG. 2.

FIG. 4 is a block diagram illustrating an example PE structure. The PE structure 120 includes a circuit for FP arithmetic and a path for data transfer, besides a conventional PE structure for integer arithmetic. The PE 120 includes a 16-bit ALU 122, multiplexers 124a and 124b that inputs two pieces of data to the ALU 122, a temporary register 125 and an output register 127 that store calculation results of the ALU 122, and a shifter 126 for a shift operation.

The multiplexers 124a and 124b each input one pieces of data selected from data received from another PE 120, data buses DATA A and DATA B, a frame buffer FB, the temporary register 125, and a context layer of a configuration cache (not shown) to the ALU 122. The ALU 122 calculates the two received input values. The resultant values calculated by the ALU 122 are stored in the temporary register 125 or the output register 127. The result values stored in the temporary register 125 are reused by the ALU 122. The shifter 126 performs a shift operation for multiplication or division, and the final result values stored in the output register 127 are provided as inputs to another PE 120 through the data bus DATA A or DATA B, stored in the frame buffer FB through the data bus DATA A or DATA B, or outputted to an output device (not shown).

Example circuits and paths added to the PE 120 for FP arithmetic are indicated using reference numbers ①, ②, and ③.

The reference number ① represents a register (not shown) and a data path for processing a signed signal during the FP arithmetic. The signs of two operands are received and stored, and values resulting from performing XOR operation on the values of the two signs are stored. The data path ① is valid only in a mantissa PE, and a sign of a result value is determined during multiplication/subtraction.

The reference number ② represents a circuit (now shown) and a data path for processing a no-shift output signal. While an ALU of a conventional PE outputs only one result, the ALU 122 of the present disclosure simultaneously outputs two output values for the FP arithmetic, and thus a conventional data path is expanded. Because the ALU 122 does not simultaneously perform a shift operation on the two output values, the shifter 126 is connected to one result value. Accordingly, values that do not need to pass through the shifter 126, such as a flag vector, are directly outputted to the output register 127 through the newly expanded data path ②.

The data path ② outputs each value for a swap command that exchanges the two operands. Alternatively, when an exponent is n-bit shifted to the left or right during a normalization process, the exponent should add or subtract n from the original value. Here, a mantissa PE performs a shift operation through the shifter 126, and transmits the value of n to an exponent PE through the data path ②.

The reference number ③ represents a data path for a round signal. A rounding operation is performed after shifting the exponent during the FP arithmetic, and for this, 2 lower bits are added to the shifter 126, and the data path of ③ is newly expanded in order to process expanded data.

Figure 5:
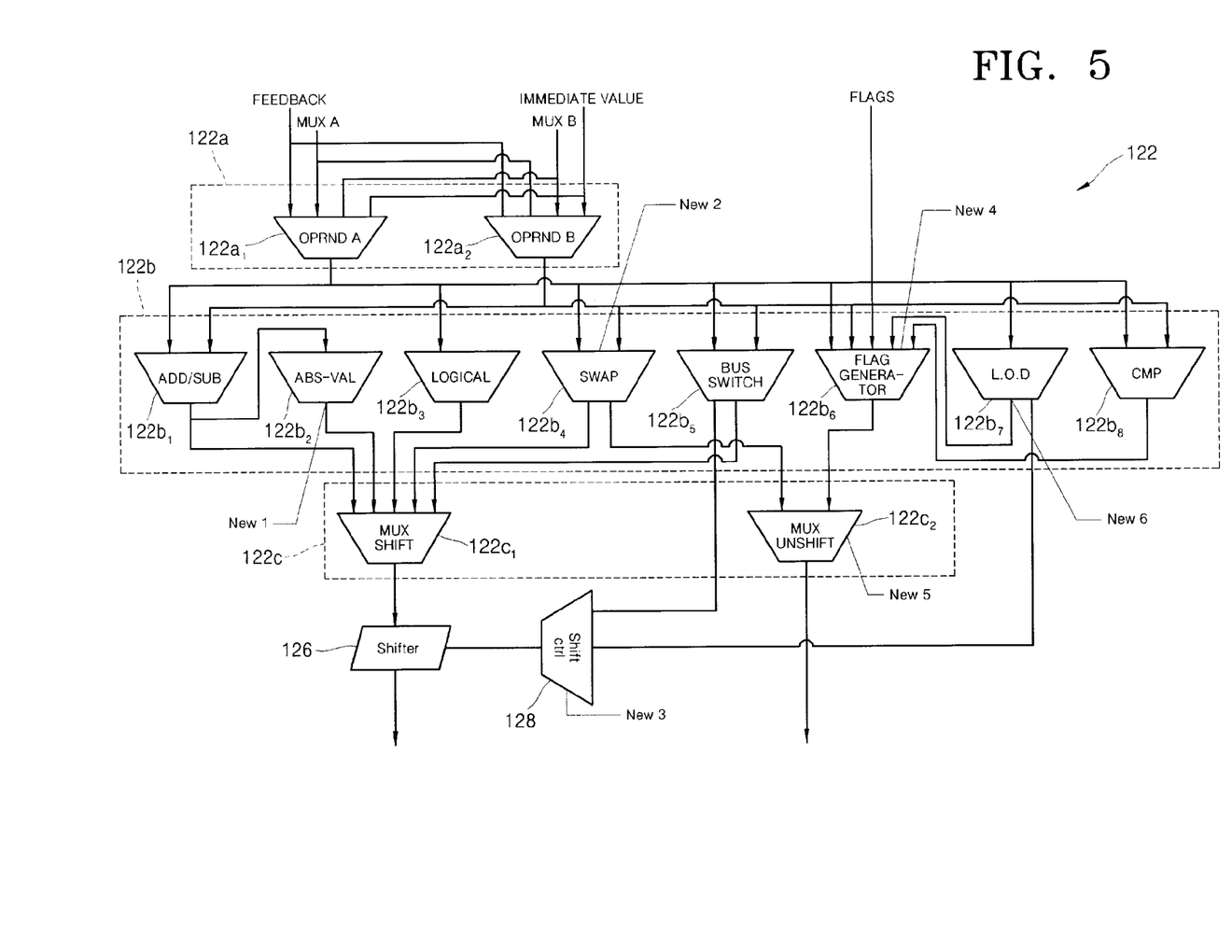
FIG. 5 is a block structure illustrating an arithmetic logic unit (ALU) in the PE structure of FIG. 4.

FIG. 5 is a block diagram illustrating an example ALU 122 in a PE 120. The ALU 122 includes an operand selector 122a, which selectively outputs operands, an operand operator 122b, which performs detailed operations of the operands, and a shift calculation selector 122c, which selectively outputs resultant values of the operand operator 122b to a shifter 126.

The operand selector 122a includes two operand multiplexer (MUX) circuits $122a_1$ and $122a_2$ that respectively receive operands from two multiplexers MUX A and MUX B, operands through feedback, or an immediate value stored in a context layer of a configuration cache (not shown). The operand selector 122a selectively outputs one value from the received operands. Also, the operand operator 122b includes an addition or subtraction (ADD/SUB) circuit $122b_1$, an absolute value calculator (ABS-VAL) circuit $122b_2$, a logical circuit $122b_3$, a swap circuit $122b_4$, a bus switch circuit $122b_5$, a flag generator circuit $122b_6$, a leading one detector (LOD) circuit $122b_7$, and a comparator (CMP) circuit $122b_8$.

The shift calculation selector 122c includes a MUX shift circuit $122c_1$, which receives result values requiring a shift operation from among the result values of each element of the operand operator 122b and selectively outputs the received result values. The shift calculation selector 122c also includes a MUX un-shift circuit $122c_2$, which receives result values that do not require a shift operation and selectively outputs the received result values.

Various circuits can be added to the PE 120 according to the present disclosure to support FP arithmetic. Thus, the circuits indicated by reference names New1 through New6 are circuits added to an ALU of a conventional PE for integer arithmetic.

The added circuits New1 through New6 include an absolute value calculator circuit $122b_2$, a swap circuit $122b_4$, a flag generator circuit $122b_6$, a LOD circuit $122b_7$, a MUX un-shift circuit $122c_2$, and a shift control circuit 128 that controls the shifter 126. The absolute value calculator circuit $122b_2$ obtains a difference between the values of two operands. The swap circuit $122b_4$ exchanges the two operands. The flag generator circuit $122b_6$ generates a flag to be transmitted to another PE. The LOD circuit $122b_7$ obtains a location of the most significant bit having a value of 1 so as to normalize an exponent. The MUX un-shift circuit $122c_2$ outputs a result of swapping the two operands and the flag. The shift control circuit 128 controls the shifter 126 so as to perform not only a control signal of a context word but also a self-generated shift value for normalization. The shift control circuit 128 is a circuit for controlling the shifter 126 and may not be included in the ALU 122.

The absolute value calculator circuit $122b_2$ is added to the ALU 122 because an operation of calculating the difference between the values of the two operands is added, and the swap circuit $122b_4$ is a substitution for a conventional MUX circuit which is changed to support a swap command that outputs two output values. The flag generator circuit $122b_6$ generates a flag for overflow that is generated by the LOD circuit $122b_7$ or the comparator circuit $122b_8$.

At the ALU 122, an operand A and an operand B are received through the MUX A and MUX B, through feedback, or through the context layer. The received operands A and B are provided as inputs to each element including the addition/subtraction circuit $122b_1$, the logical circuit $122b_3$, the swap circuit $122b_4$, the bus switch circuit $122b_5$, the flag generator circuit $122b_6$, and the comparator circuit $122b_8$. Only one operand, for example, the operand A, is provided as an input to the logical circuit $122b_3$ and the LOD circuit $122b_7$. An output value of the addition/subtraction circuit $122b_1$ is provided as an input to the absolute value calculator circuit $122b_2$. The logical circuit $122b_3$ is used when a logical operation is required, and the bus switch $122b_5$ receives a result of inputting an operand in a multiplier or a divider (not shown) while performing multiplication or division operations.

Result values that require a shift operation from among the result values of each element are provided as inputs to the MUX shift circuit $122c_1$. The result values that do not require a shift operation are provided as inputs to the MUX un-shift circuit $122c_2$. The shift control unit 128 performs the shift operation by controlling the shifter 126 by receiving a shift value stored in the context layer, a shift value received through the bus switch $122b_5$, and a shift value self-generated by the LOD circuit $122b_7$.

Operations of each element are performed using the control signals of the context word for controlling the each element. Examples of the control signals are shown in Table 1 below. In Table 1, elements that do not have numbers are elements that are not illustrated in FIG. 5. MUX A and MUX B represent the two multiplexers shown in FIG. 4. SEL_OUT and SEL_REG represent a type of MUX circuit and exist between the shifter 126 and the output register 127. XCEPTION is a circuit for an exception check that exists in front of the output register 127. SIGN_Ctrl is a circuit for controlling a sign that exists inside the output register 127. Such elements are included in a conventional PE for integer arithmetic, and thus further descriptions of control signals are not provided.

the context layer. In other words, when sel4 is received, the operand MUX circuit $122a_1$ outputs an immediate value of the context layer.

The addition/subtraction circuit $122b_1$ performs addition, subtraction, or rounding according to a corresponding control signal. When sel3 is received, the addition/subtraction circuit $122b_1$ selectively performs addition and subtraction according to a radix point.

For a swap circuit $122b_4$, when sel1 is received, a swap operation is performed. When sel2 is received, operands are outputted to the MUX shift circuit $122c_1$ or the MUX un-shift circuit $122c_2$ without the swap operation. For a bus switch circuit $122b_5$, which is used to perform multiplication or division as described above, when sel1 is received, operands are provided as inputs to the multiplier. When sel2 is received, a calculation result is received from the multiplier. Sel3 and sel4 are control signals for the divider, and are equivalent to the control signals for the multiplier.

The comparator circuit $122b_8$ compares the two operands and outputs the result. Here, Eq represents an example when the two operands are the same. Neq represents an example when the two operands are not the same. Ge represents an example when one operand is equal to or larger than the other operand. Gt represents an example when one operand is larger than the other operand.

TABLE 1

Control Signal of ALU of PE

| num | name | sel1 | sel2 | sel3 | sel4 | sel5 |
|---|---|---|---|---|---|---|
| . | MUX A | | | | | |
| . | MUX B | | | | | |
| 1 | OPRND A | Out<=feeback | Out<=MUX A | Out<=MUX B | Out<=immed | |
| 2 | OPRND B | Out<=feeback | Out<=MUX A | Out<=MUX B | Out<=immed | |
| 3 | ADD/SUB | Out<=opA+opB (add) | Out<=opA−opB (sub) | if(c=true)add else sub | Out<=round | |
| 4 | LOGICAL | Out<= AND | Out<= OR | Out<= XOR | | |
| 5 | SWAP | Out<=swap | OUT<=mux out | | | |
| 6 | BUS SWITCH | Bus_out<=mult_out | Bus_in<=mult_in | Bus_out<=div_out | Bus_in<=dive_in | |
| 7 | FLAG GENERATOR | Out<=flag 1 | Out<=flag 2 | Out<=flag 3 | Out<=flag 4 | |
| 8 | CMP | Out<=Eq | Out<=Neq | Out<=Ge | Out<=Gt | |
| 9 | MUX SHIFT | Out<=abs_out | Out<=mux_out | Out<=add_out | Out<=logic_out | Out<=shared logic |
| 10 | MUX UNSHIFT | Out<=mux_out | Out<=flag | | | |
| 11 | SHIFT Ctrl | Out<=context | Out<=shared logic | Out<=align | Out<=lod | |
| . | SEL_OUT | Out<=mux_shift | Out<=mux_unshift | | | |
| . | SEL_REG | Out<=mux_shift | Out<=mux_unshift | | | |
| . | EXCEPTION | enable | disable | | | |
| . | SIGN Ctrl | store(+) | store(−) | Select | xor | Append |

The first column with a column label, name includes names of each circuit element shown in FIG. 4. The remaining columns with column labels sel1 through sel5 include names of control signals provided as inputs to each circuit element. Operations of each circuit according to a corresponding control signal are described with reference to FIG. 5 below.

When control signal sel1 is provided as input to the operand MUX circuit $122a_1$, the operand MUX circuit $122a_1$ outputs a signal inputted via feedback. When control signal sel2 is inputted to the operand MUX circuit $122a_1$, a signal received from MUX A is outputted. The same applies for sel3 and sel4. In FIG. 5, immed represent a signal received from The MUX shift circuit $122c_1$ and the MUX un-shift circuit $122c_2$, like the operand MUX circuit $122a_1$, selectively output received signals according to a corresponding control signal. Here, shared logic represents a signal received from the bus switch circuit $122b_5$.

The shift control circuit 128 outputs a shift value received from the context layer, the bus switch circuit $122b_5$, or the LOD circuit $122b_7$ to the shifter 126 according to a control signal. In table 1, sel3 control signal indicates an instruction to output a shift value to the shifter 126 by a difference of exponents during a rounding operation, and the shift value is received form the operand MUX circuit $122a_1$ or $122a_1$.

Four FP arithmetic operations are performed in combination with operations of an integer PE that is expanded from a conventional operation. Integer arithmetic of a conventional PE is a single-cycle, whereas FP arithmetic is a multi-cycle. Thus, during the FP arithmetic, a context word for the PE should be generated in order to perform a desired operation at each cycle.

When N cycles are performed according to a structure of a reconfiguration array, a total of N commands are required in order to generate required context control words at each cycle. Accordingly, if the FP arithmetic is often used, the size of a configuration cache greatly increases.

In order to remedy such a problem associated with increased size, the present disclosure implements an efficient finite state machine (FSM) based control structure.

Figure 6:
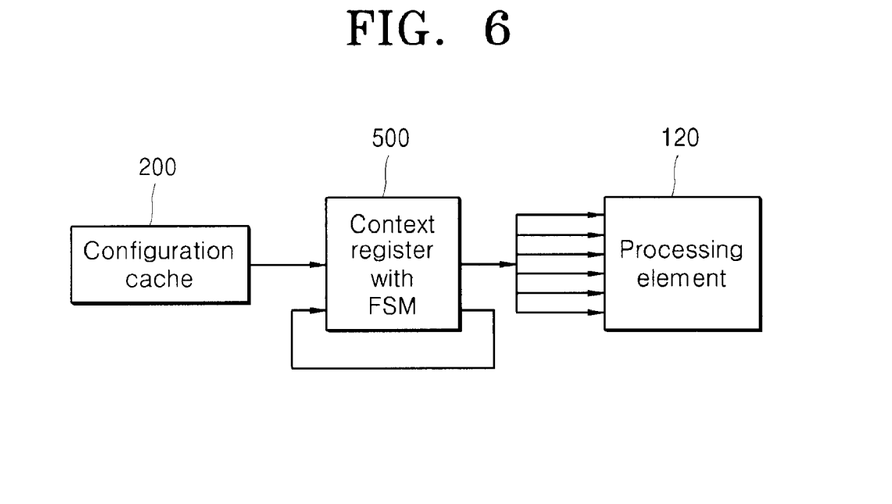
FIG. 6 is a functional diagram of a reconfigurable cache including a finite state machine (FSM).

FIG. 6 is a functional diagram of a reconfigurable cache including an FSM 500. Example processes for performing FP arithmetic is described with reference to FIG. 6. When each FP arithmetic is performed, corresponding FP arithmetic is mapped to one command in a configuration cache 200. In addition, a context word required at each cycle is generated through a transition of the FSM 500 from an entry of the corresponding operation command. Because such an FSM based control structure can reduce the number of context layers of the configuration cache 200, the configuration cache 200 can have an efficient memory size. By applying such a configuration cache 200 to the multimedia platform, an efficient multimedia platform can be realized.

Context words generated by the FSM 500 are stored in the context layer of the configuration cache 200 or a context register, and then used in a multi-cycle operation of each PE 120. Thus for convenience of understanding, the FSM 500 is illustrated with the context register.

A basic arithmetic operation supported by an FPU-PE structure is four SIMD arithmetic operations. The basic arithmetic operation can be expanded to a transcendental function, such as a trigonometrical function or a log function, by using a Taylor series approximation. If required, three or four PEs 120 can be combined to form the FPU-PE structure.

Each FP arithmetic performed through a multi-cycle operation is selected and/or operated through a context word for controlling a cycle at each cycle. Detailed examples of the multi-cycle operation are described with reference to FIGS. 8 and 9.

Figure 7:
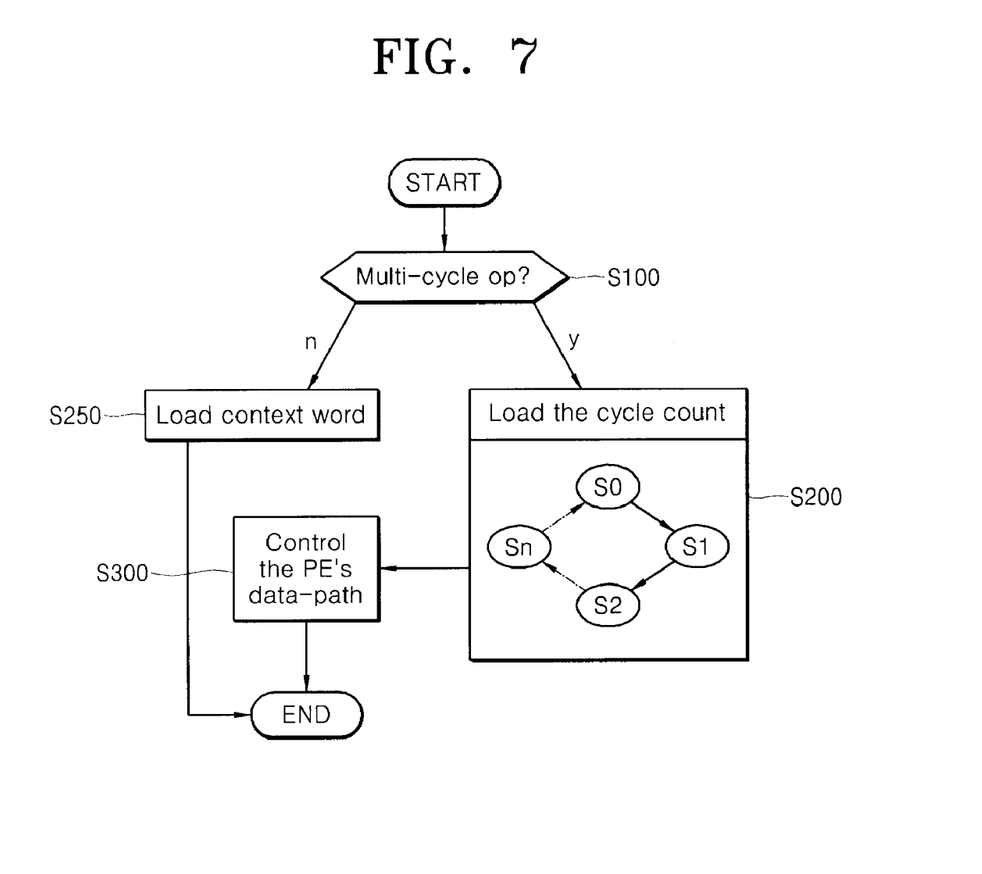
FIG. 7 is a flowchart illustrating an example processes of generating a context word for a multi-cycle operation using at least the FSM of FIG. 6.

FIG. 7 is a flowchart illustrating example processes for generating a context word for a multi-cycle operation by the FSM 500 of FIG. 6. When an operation command is inputted, a configuration cache determines whether the operation command is a multi-cycle operation command (S100). If the operation command is not a multi-cycle operation command, a context word is loaded directly from a corresponding layer (S250), and an operation is performed in each PE. For example, operations S100 and S250 are performed for integer arithmetic.

If the operation command is a multi-cycle operation, i.e. FP arithmetic, the FSM is operated so as to generate context words in a number corresponding to the number of cycles in S200. The generated context words are transferred to each cycle of a corresponding PE and the operations are controlled in each cycle (S300).

For a multi-cycle operation such as FP arithmetic, the configuration cache having the FSM based control structure does not map a micro-operation of each cycle as one command. Instead, the configuration cache maps the entire operation as one command. The command is decoded, and when the command is a multi-cycle operation command, the FSM is operated. Thus, the multi-cycle operation command is an operation entry point of the FSM. The FSM generates a context word for operating a control signal required in the operation of each cycle. Accordingly, the configuration cache only stores the entry point of the FSM instead of storing all context words for micro-operations performed at each cycle. Thus, the space of the configuration cache is saved.

Figure 8:
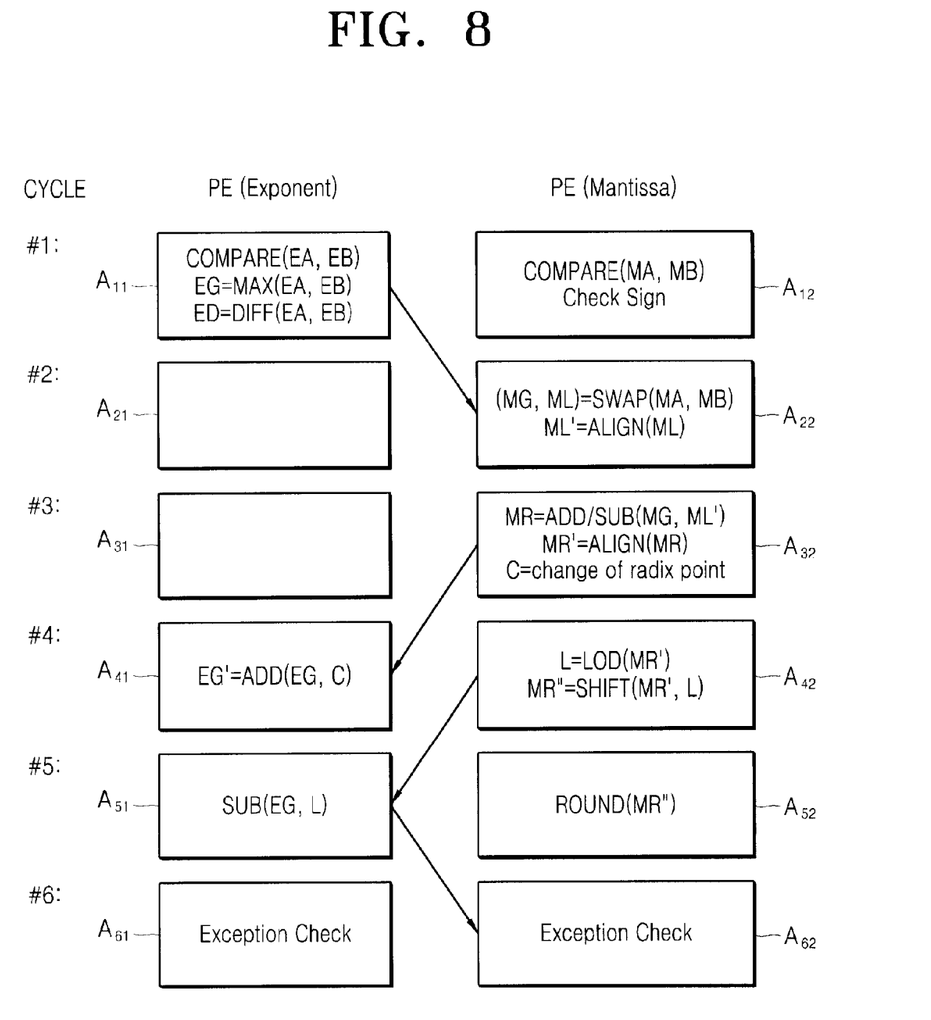
FIG. 8 is a flowchart illustrating FP based addition or subtraction.

Example processes for performing FP arithmetic of four arithmetic operations using an FSM are described with reference to FIG. 8 below. FIG. 8 is a flowchart illustrating FP based addition or subtraction. The FP based addition or subtraction performs an arithmetic operation during total 6 cycles. Two received values are compared in a first cycle. The values are compared for each exponent and mantissa in operations $A_{11}$ and $A_{12}$. Here, MAX denotes that a value larger than the other is obtained, and DIFF denotes that an absolute value of a difference between the two values is obtained.

In a second cycle, bits of a mantissa having a smaller value are aligned by shifting the bits by a difference between the exponents in operation $A_{22}$. At this time, an exponent PE stands by without operating in operation $A_{21}$.

In a third cycle, a difference between the mantissas is obtained, and a 1-bit alignment is performed by considering overflow in operation $A_{32}$. Here, the exponent PE stands by without operating in operation $A_{31}$.

In a fourth cycle, a result calculated in previous cycles is normalized so that the most significant bit becomes 1 in operation $A_{41}$. In operation $A_{42}$, a value of a radix point that is changed by normalization of the mantissa is transmitted to the exponent PE.

In a fifth cycle, a radix point is updated in operation $A_{51}$ by subtracting the changed value of radix point from the exponent. In addition, the mantissa PE performs a rounding operation in operation $A_{52}$.

In a sixth cycle, an exception check is performed in operations $A_{61}$ and $A_{62}$. The exception check in the exponent PE may be performed in the fifth cycle. Since the result of the exponent PE is applied to the mantissa PE when the exception check is performed in the fifth cycle, the exception check of the exponent can be performed in the fifth cycle.

The FP based subtraction is performed in the same manner as the FP based addition after changing a sign of a number that is subtracted. Arrows in FIG. 8 denote data transfer paths between the mantissa PE and the exponent PE.

Figure 9:
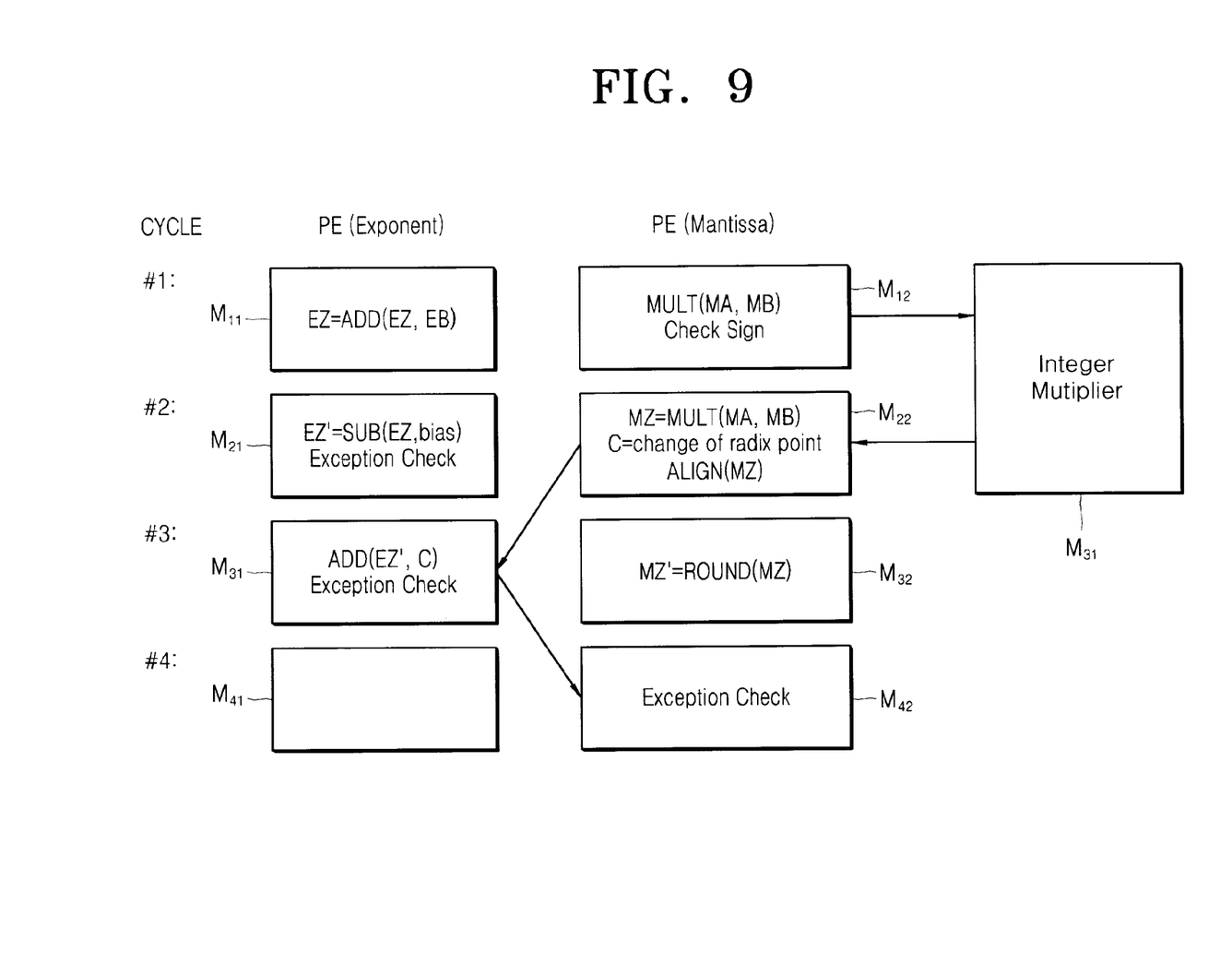
FIG. 9 is a flowchart illustrating FP based multiplication.

FIG. 9 is a flowchart illustrating an example FP based multiplication. The FP based multiplication is performed during a total of 4 cycles. An integral multiplier and an integral divider of a conventional CGRA are logic circuits that are too big to be embedded in a PE, and so several PEs share a multiplier and a divider in a row or column unit. A CGRA employs such a structure as well. Multiplication or division of FP arithmetic is performed according to an exponent and a mantissa, where the exponent is processed using addition or subtraction and the mantissa is processed via multiplication or division. One of the two PEs that form an FPU-PE structure calculates the mantissa by using the shared multiplier or divider. The other PE calculates the exponent in parallel.

Here, calculations in the multiplier or divider can be performed using several types of multi-cycle operation. A multiplier or a divider that employs a suitable type of multi-cycle operation can be used by considering calculation precision and number of cycles. For example, a multiplier performing a multi-cycle operation of 2 cycles can be used.

Referring to FIG. 9, in a first cycle, an exponent PE performs addition in operation $M_{11}$, and a mantissa PE transmits two operands to a multiplier in operation $M_{12}$.

In a second cycle, a 1-bit alignment is performed in operation $M_{22}$ according to a multiplication or division result value of the multiplier. The exponent PE performs bias subtraction in operation $M_{21}$. Because a bias is generally included in an exponent of an operand, two biases are included by addition. Accordingly, one bias should be subtracted so as to express a normal exponent.

In a third cycle, the exponent PE applies the result of aligning of the mantissas in previous cycles to an exponent in operation $M_{31}$, and the mantissa PE performs a rounding operation in operation $M_{32}$. Also, when the exponent exceeds a certain range, the exponent PE transmits a signal so that such a fact can be applied to the mantissa in the next cycles. In other words, an exception check is performed.

In a fourth cycle, the mantissa PE performs the exception check in operation $M_{42}$. Like the addition operation, an exception check of the exponent can be performed in the fourth cycle.

The arrows in FIG. 9 represent a data transfer path between the mantissa PE and the exponent PE, like in the addition and the subtraction.

Figure 10:
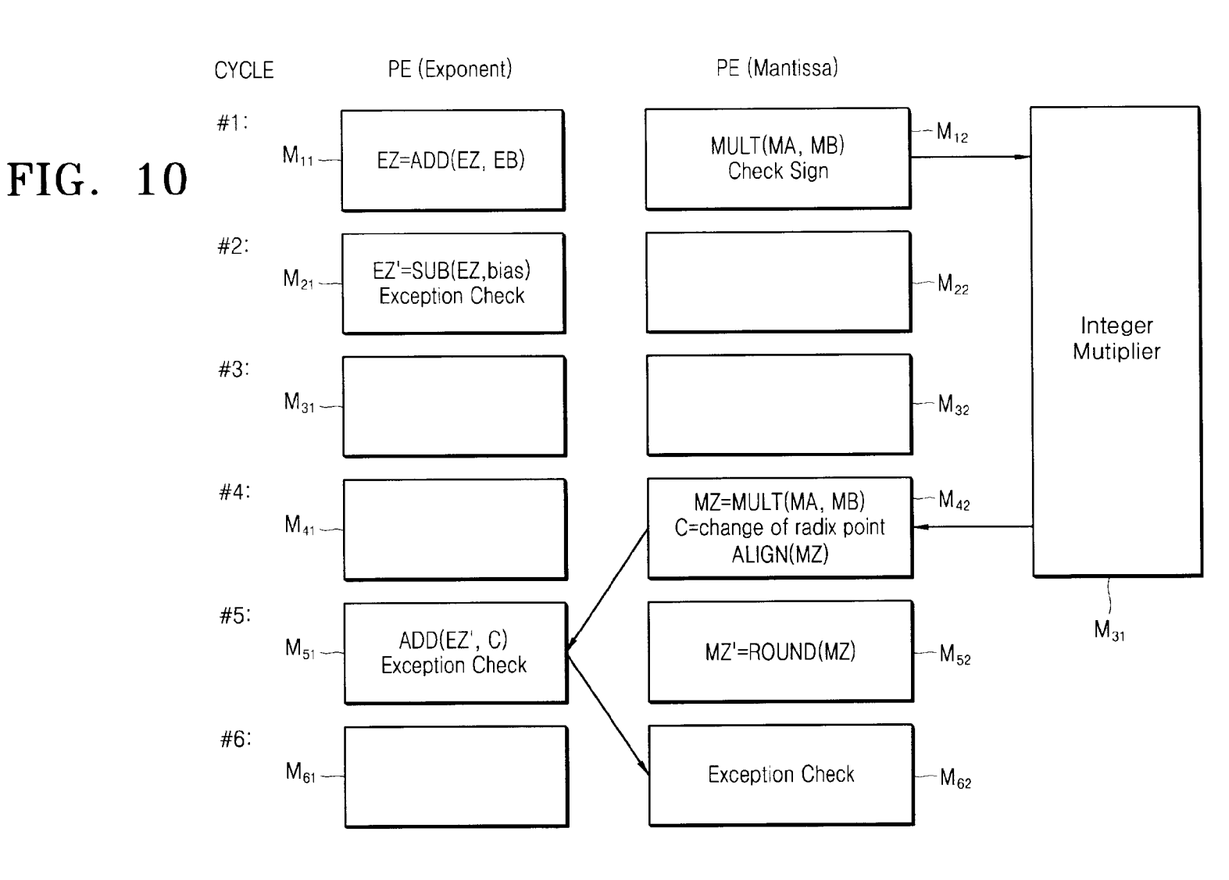
FIG. 10 is a flowchart illustrating FP based division.

FIG. 10 is a flowchart illustrating an example FP based division. The FP based division uses a divider that performs a multi-cycle operation of 4 cycles. Accordingly, the FP based divider performs an arithmetic operation during a total of 6 cycles. For the division operation, the divider performs a multi-cycle operation of 4 cycles. Thus, the division is performed in the same manner as the multiplication except operations $M_{22}$, $M_{31}$, and $M_{32}$, where an exponent PE and a mantissa PE stands by for an arithmetic operation result of the divider.

As described above, the multiplier and the divider can use several types of multi-cycle operation. If the number of cycles in the multiplier and the divider decreases, calculation precision may deteriorate as well. Accordingly, the multiplier and the divider employ a suitable type of multi-cycle operation considering the number of cycles necessary to ensure high calculation precision and speed.

Processes of an FP based multi-cycle operation have been described above as an example of four arithmetic operations, but a multi-cycle operation can be performed not only for the four arithmetic operations but also for a transcendental function operation by combining suitable control signal sequences. For the transcendental function operation, an FPU-PE structure is formed by combining 3 or 4 PEs instead of 2 PEs for a more efficient arithmetic operation.

As described above, a PE structure forming an FP-RA includes new data paths and circuits in addition to the elements of a conventional PE for integer arithmetic. By forming an FP-RA in a pair, FP arithmetic can be supported by using a conventional RA structure. Also, by using the PE structure of the present disclosure in FP arithmetic, the size of the memory can be remarkably reduced.

Also, the FP-RA control circuit according to the present disclosure performs a corresponding multi-cycle operation by generating a command for a multi-cycle using a multi-cycle control circuit, such as an FSM. The command is generated after mapping an arithmetic operation, such as addition or multiplication, as one command, instead of mapping each arithmetic operation of each cycle as one command during FP arithmetic using each operation command. Accordingly, a memory capacity of a configuration cache can be saved, and efficient arithmetic operation can be performed.

By realizing the reconfiguration array processor that can support an FP operation through a PE structure and an FP-RA control circuit according to the present disclosure, a high performance operation processor can be realized in terms of hardware and processor efficiency. Also, such a reconfigurable array processor is realized as a multimedia platform using an SoC structure, and thus can be effectively used in a mobile multimedia that requires low power and high performance when compared with expenses.

The PE structure and the FP-RA control circuit of the present disclosure can be applied in a geometry operation in a graphic field. Example application fields include 1) physical engine hardware acceleration in a game engine, 2) graphic geometry pre-processor hardware acceleration, such as evaluator, tessellation, interpolation for a curved surface/curve process like a Bezier curve, 3) a geometry unit (matrix transformation & lighting effects) from a 3D graphic pipeline, and 4) a 3D vertex shader.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this application.

What is claimed is:

1. A system for controlling a processor element (PE) structure comprising:
   a PE structure comprising two or more PEs in communication with each other to form a floating point unit (FPU)-processing element;
   a floating point-reconfigurable array (FP-RA) control circuit in communication with the PE structure to control the PE structure to perform FP arithmetic; and
   a configuration cache in communication with the FP-RA control circuit to store a context word used by the PE structure to perform the FP arithmetic operations,
   wherein when the FP arithmetic requires a multi-cycle operation, the configuration cache inputs an entry point to the FP-RA control circuit and the FP-RA control circuit generates the context word for each cycle of the multi-cycle operation.

2. The system of 1, wherein the FP-RA control circuit comprises a finite state machine (FSM) based control circuit.

3. The system of claim 2, wherein the configuration cache comprise a register; and
   the FSM based control circuit is connected to the register of the configuration cache to generate and transmit the context word for each cycle of the multi-cycle operation of the PE structure to the register of the configuration cache.

4. The system of claim 3, wherein an operation command of the FP arithmetic is mapped and decoded in the configuration cache, and the FSM based control circuit operates when the operation command is a command for a multi-cycle operation.

5. The system of claim 4, wherein the configuration cache determines whether the operation command is the command for the multi-cycle operation, and if the operation command is the command for the multi-cycle operation, the FSM based control circuit is operated so as to generate the context word for the multi-cycle and controls the PE structure to perform the multi-cycle operation, and if the operation command is not the command for the multi-cycle operation, the FSM based control circuit is not operated.

6. The system of claim 2, wherein the PE structure uses the FSM based control circuit to perform FP arithmetic on four arithmetic operations and a transcendental function.

7. The system of claim 6, wherein one of the two PEs forming the FPU-PE comprises a mantissa PE that receives signs and mantissas of the two operands; and the other PE comprises an exponent PE that receives exponents of the two operands; wherein the PE structure performs the FP arithmetic for addition or subtraction, and the addition or subtraction is performed using the multi-cycle operation that includes 6 cycles.

8. The system of claim 7, wherein the PE structure is to perform the FP arithmetic for the addition operation comprising:

compare values of two operands received by the PE structure based on exponents and mantissas of the received operands in a first cycle;

arrange bits of one of the exponents having a smaller value of the two by shifting the bits by a difference between the mantissas in a second cycle;

obtain a difference between the exponents and performing a 1-bit alignment on the difference between the exponents considering an overflow in a third cycle;

normalize a result of the third cycle so that the most significant bit is 1 in a fourth cycle;

update a radix point in the exponent PE and performing a rounding operation in the mantissa PE in a fifth cycle; and perform an exception check in a sixth cycle.

9. The system of claim 8, wherein the PE structure is configured to transmit the radix point changed by the normalization to the exponent PE in the fourth cycle and update the radix point in the exponent PE by using the received radix point in the fifth cycle.

10. The system of claim 8, wherein the PE structure is to perform the subtraction in a same manner as the addition after changing a sign of a number that is subtracted.

11. The system of claim 6, wherein the PE structure performs the FP arithmetic for multiplication or division, the multiplication is performed through a multi-cycle operation of a total of 4 cycles, and the division is performed through a multi-cycle operation of a total of 6 cycles.

12. The system of claim 11, wherein the PE structure performs the multiplication or division based on an exponent and a mantissa, the exponent is processed by addition or subtraction, the mantissa is processed by multiplication or division, and the mantissa PE that calculates the mantissa from among the FPU-PE is connected to a multiplier or a divider.

13. The system of claim 11, wherein the PE structure performs the multiplication by performing the addition or subtraction in the exponent and the multiplication in the mantissa in a first cycle; performing a 1-bit alignment according to the result of the multiplication in the multiplier in a second cycle; performing a rounding operation on the mantissa, applying the result of the 1-bit alignment of the mantissa performed in the second cycle in the exponent; and if the value of exponent exceeds a certain range, transmitting a signal that is to be applied to the mantissa in a third cycle; and performing an exception check in the mantissa in a fourth cycle.

* * * * *